April 24, 1962
O. D. JACOBSON
3,030,985
AUTOMATIC WIRING APPARATUS
Filed July 7, 1958
5 Sheets-Sheet 2
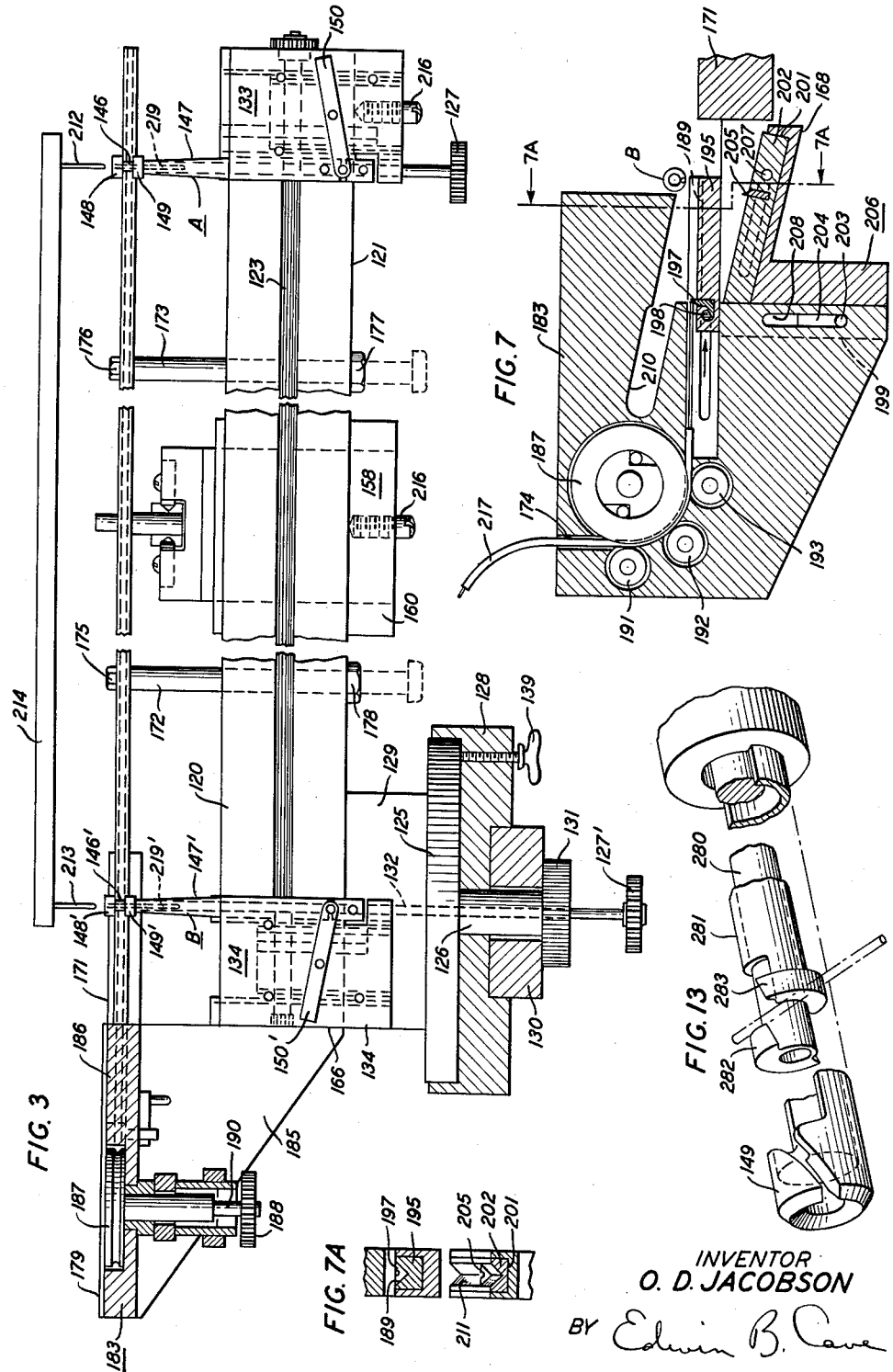
INVENTOR
O. D. JACOBSON
BY Edwin B. Cave
ATTORNEY

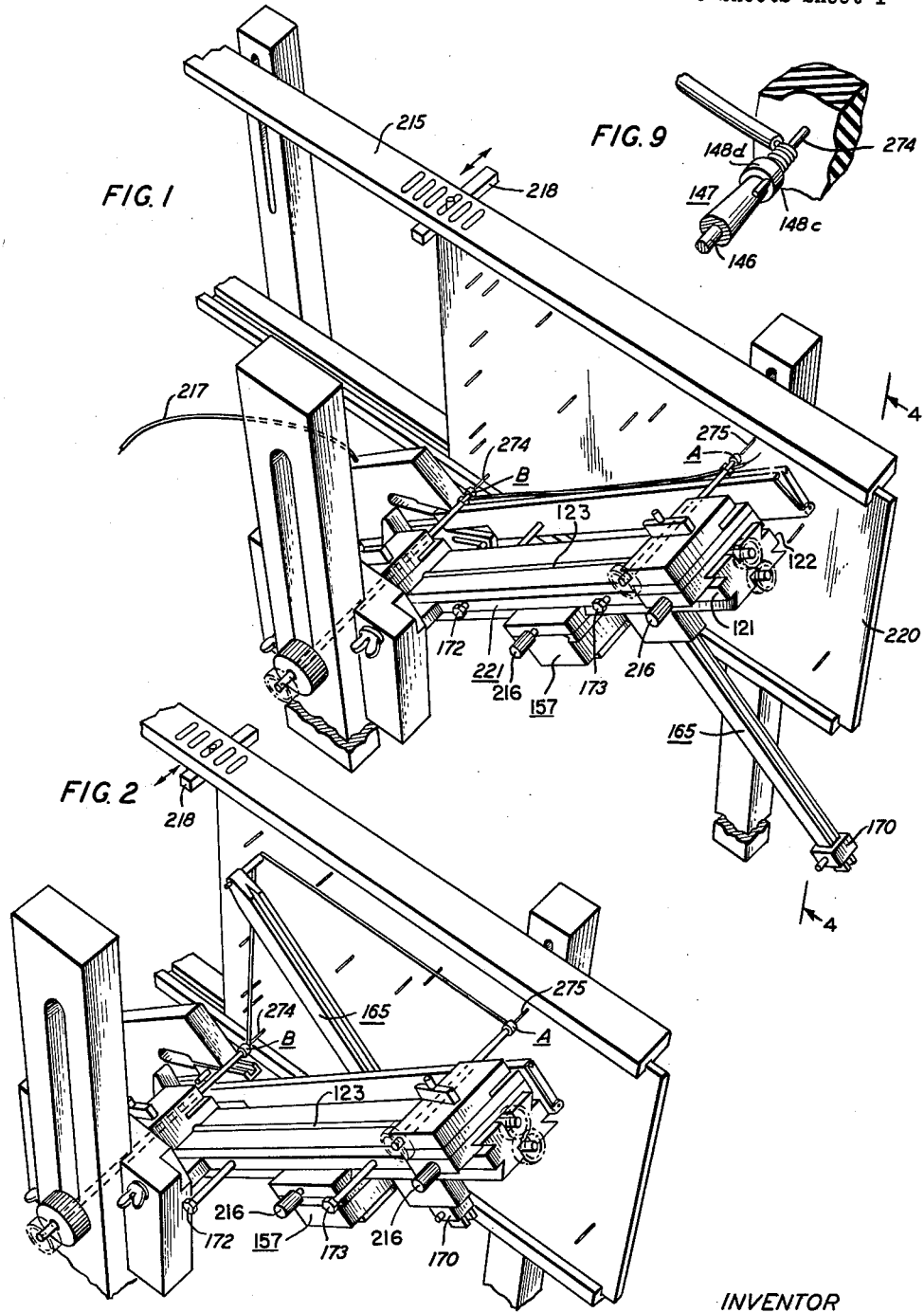

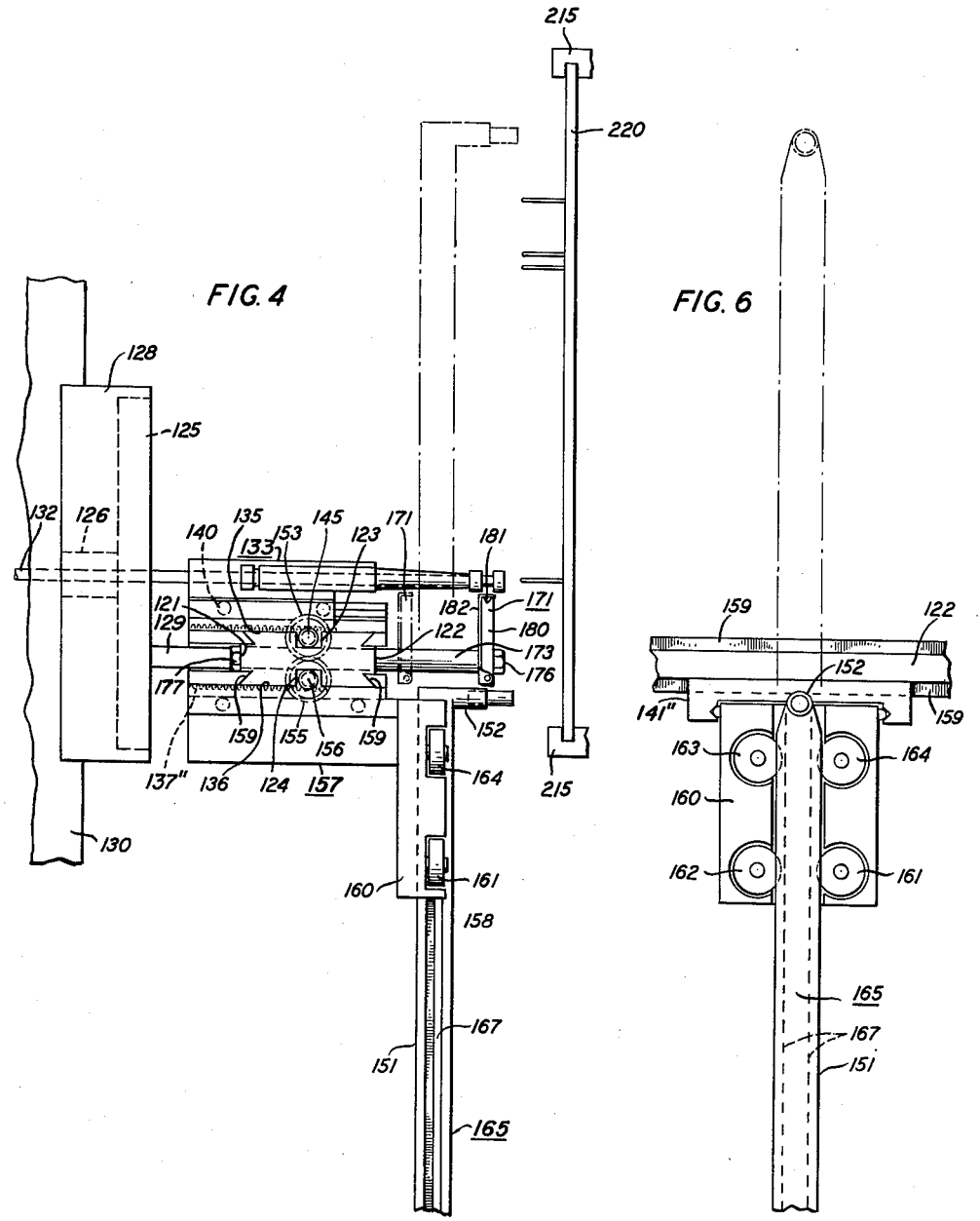

April 24, 1962
O. D. JACOBSON
3,030,985
AUTOMATIC WIRING APPARATUS
Filed July 7, 1958
5 Sheets-Sheet 4
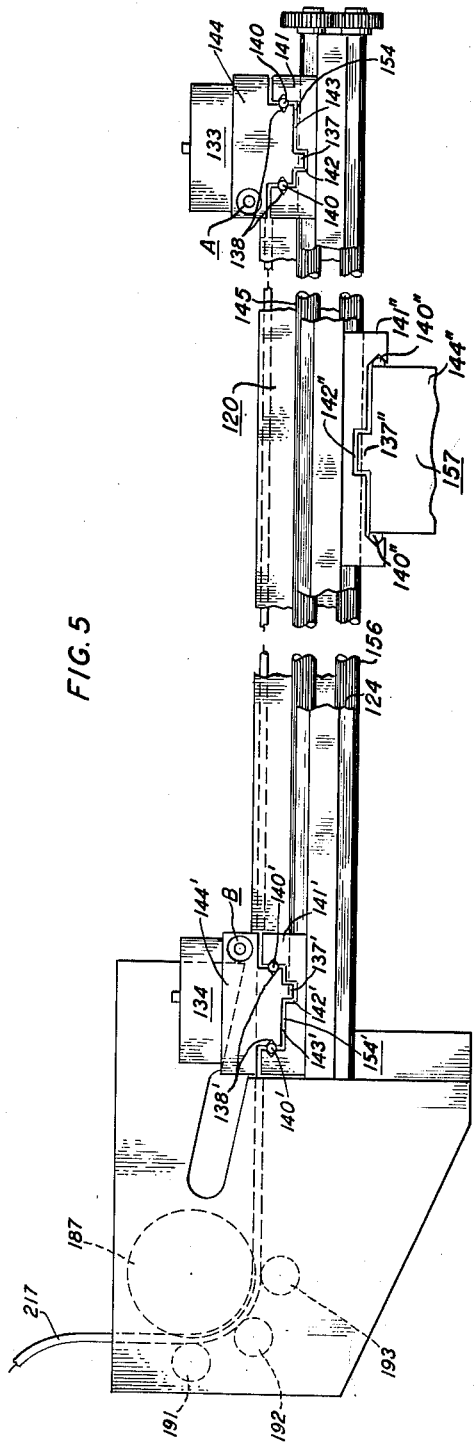
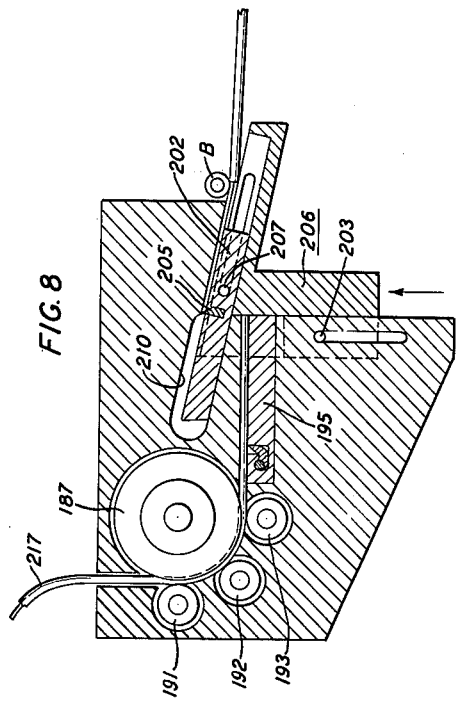
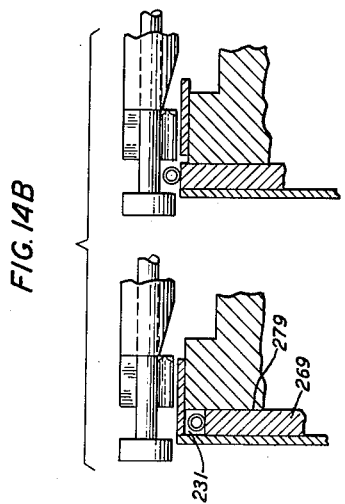
INVENTOR
O. D. JACOBSON
BY Edwin B. Cave
ATTORNEY April 24, 1962  O. D. JACOBSON  3,030,985
AUTOMATIC WIRING APPARATUS
Filed July 7, 1958  5 Sheets-Sheet 5

INVENTOR
O. D. JACOBSON
BY Edwin B. Cave
ATTORNEY 3,030,985
AUTOMATIC WIRING APPARATUS
Oscar D. Jacobson, New York, N.Y., assignor to Bell
  Telephone Laboratories, Incorporated, New York,
  N.Y., a corporation of New York
Filed July 7, 1958, Ser. No. 746,948
8 Claims. (Cl. 140—71)

This invention relates to automatic wiring apparatus, and more particularly to machinery for connecting wires between terminals of an array of electrical apparatus units.

In the automatic wiring machines disclosed in the applications of T. L. Dimond, Serial No. 370,148 filed July 24, 1953, now Patent No. 2,862,671, R. F. Mallina, Serial No. 401,505, filed December 31, 1953, now Patent No. 2,905,400, and my previously filed application, Serial No. 601,996 filed August 3, 1956, the wire and wire wrapping tools are moved under the control of programming means, e.g., a punched tape, to connect together a plurality of groups of terminals on a wiring panel in accordance with instructions supplied by the tape. Such machines are particularly useful where moderate numbers of panels of the same circuit configuration are to be wired. However, the number of panels wired by these machines in a given time is limited in part, at least, by the time spent in moving the wire and the wrapping tools to and from the particular terminals to be wired. For obvious reasons it is desirable to increase the number of panels wired in a given time period. The present invention has found that the wiring of large numbers of duplicate panels may be speeded by employing wiring machines with limited wrapping tool motion at a series of stations on an assembly line. Machines in accordance with the present invention are usually set up to make but one of the many interconnections at each station. The time spent in moving the panels between the stations can be made less than that for prior art devices in moving the wire and wrapping guns to make the required interconnections. The limited operation also reduces the complexity, initial cost and repair of the machines.

A general object of the invention is to simplify and facilitate automatic machine wiring.

One particular object of the invention is to produce modular, non-modular and random wiring with the same wiring machine without resorting to programming.

Another particular object is to facilitate multiple wiring by means of a plurality of simplified automatic wiring machines having coordinated operation on an assembly line.

A feature of this invention is a machine having a plurality of wire wrapping guns or tools mounted on support means including a suitable linkage for stationing the tools in line with any preselected terminals of a panel to be wired; a mechanism for supplying predetermined lengths of wire to a feed bar, the wire being deformed in a preselected direction by the mechanism; the feed bar automatically loading the tools when operated; and, means to engage the tools and terminals and return the tools to their normal positions after wiring of the terminals.

A specific feature of the invention is a feed bar having a covered, wire confining groove which, when loaded with a prestressed or deformed wire and opened, directs the wire into adjacent wrapping tools.

Another specific feature is a mechanism that successively cuts and stresses predetermined lengths of insulated wire; strips the insulation from each end of the wire; and, feeds the wire to a feed bar.

Still another specific feature of the invention is a dressing finger that is selectively positionable on the machine to place a desired bend in the wire between the wrapped ends thereof.

These and other objects and features of the invention will be more fully apprehended from the following detailed description taken in conjunction with the appended drawing in which:

FIG. 1 is a perspective view of one embodiment of the present invention that is in the ready position for interconnecting preselected terminals of the panels to be wired;

FIG. 2 is a perspective view of the embodiment of FIG. 1 in the wiring position for applying wrapped wire connections to preselected terminals of a panel;

FIG. 3 is a top or plan view of the embodiment of FIG. 1 with the wrapping guns thereof being positioned by means of a template;

FIG. 4 is an end view of the embodiment of FIG. 1 looking in the direction of the arrows 4—4 after lowering the angled protractor arm to a horizontal position;

FIG. 5 is a partial rear view of the protractor arm and feeding and cutting mechanism shown in FIG. 3 rotated 90 degrees away from the panel to better show the structure of certain parts;

FIG. 6 is a rear sectional view of the dressing finger assembly shown in FIG. 4;

FIG. 7 is a sectional view of the feeding and cutting mechanism of FIG. 5 with the cover removed to show the parts therein and the action in stripping one end of an insulated wire;

FIG. 7A is a sectional view of FIG. 7 along the line 7A—7A;

FIG. 8 is another view of the mechanism of FIG. 7 showing the action in stripping and cutting the other end of the insulated wire;

FIG. 9 is a perspective view of a wrapped connection made to a terminal;

FIG. 13 is an exploded view of a wrapping tool and an adapter employed in the embodiment of FIG. 10; and FIGS. 14A and 14B are useful in explaining alternative methods of loading the wrapping guns of the embodiment shown in FIG. 10.

Figure 10:
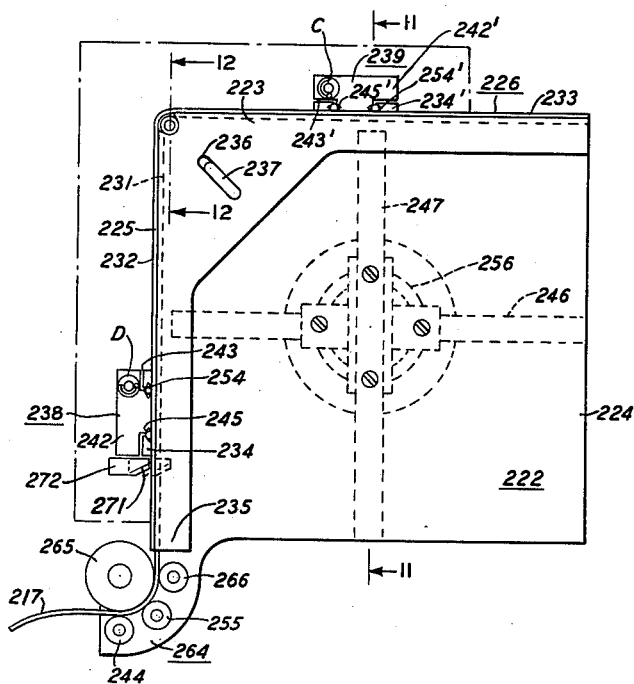
FIG. 10 is a rear view of another embodiment of the present invention.

A better understanding of the present invention may be had from a brief consideration of its mode of operation before specific details are given. The perspective views of FIGS. 1 and 2 depict one of a plurality of automatic wiring stations located in front of an assembly line or conveyor 215 that transports duplicate wiring panels 220 (only one of which is shown) to each station where an automatic wiring machine 221 included in the present invention completes one of the many interconnections to each panel. After passage before each of the machines on the line the panel is wired in a prescribed manner. It is believed apparent that the number of wiring stations in front of the assembly line is equal to the number of interconnections required to wire the panels.

As illustrated in FIGS. 1 and 2, the panels are wired in a vertical position, but may, of course, be wired in other positions by simply reorienting the assembly line and the wiring machines.

In making interconnections on the panels, i.e., as the inverted L-shaped wiring runs between terminals 274 and 275 shown in FIG. 2, the left hand wrapping gun or tool designated the A gun and the right hand wrapping gun or tool designated the B gun (as viewed from the wiring panel and looking into the wiring machine) are manually positioned before operation of the line to make the same interconnection to each panel on the line. As a panel is supplied to the wiring station, a predetermined length of insulated wire 217 is fed into the machine where the ends thereof are stripped of insulation and gripped in the A gun. After a dressing finger 165 picks up and installs a bend in the wire run between the terminals, the wire is cut and stripped for gripping by the B gun. The A and B guns and the dressing finger advance toward the panel where the former engage the terminals. The wire is then wrapped on each terminal on rotation of spindles 146 and 146' (see FIG. 3) included in the guns. The wired panel moves to the next station where another interconnection is completed. Simultaneously, the guns and dressing finger returns to the ready position shown in FIG. 1. After the next panel is centered before the machine 221, the wire is again fed into the machine for repetition of the described wiring operation.

The individual steps involved in accomplishing these wrapped wire interconnections will be described in greater detail hereinafter, but for purposes of general illustration it will be noted from the description given in connection with FIGS. 1 and 2 that the present machines are stationary except for the to and from or normal movement of the wrapping tools with respect to the panel. Such movement as is well known to those skilled in the art does not require programming means. As a consequence, the machines are of relatively simple construction and operation thereby reducing their initial cost and repair thereof. The elimination of horizontal and vertical movements of the guns and the wire also enables the machines to complete expeditiously the number of wrapped wire connections on a panel.

A more detailed explanation of the apparatus of this invention will now be given in conjunction with FIGS. 3 through 9 in which, insofar as practicable, like members identifiable in the separate figures have been given the same reference character.

In FIG. 3 the wiring machine of FIG. 1 is seen from above with a template 214 substituted for the assembly line 215 for reasons more apparent hereinafter. The machine includes a protractor arm 120 that is attached to a disc 125 by means of a connecting block 129 secured to the disc and front face 121 of the arm. The disc is journaled in an apertured slide 128 that travels on a slotted stand 130. The disc includes a cylindrical extension 126 that passes through the aperture in the slide and the slot of the stand. Threaded on the end of the extension 126 is a nut 131 which, when tightened, prevents relative movement between the stand, slide and disc. In addition to the nut 131, a winged set screw 139 also limits relative movement between the slide and the disc. A shaft 132 is journaled in the nut 131, the extension 126, the disc 125 and connects to the spindle of the B wrapping tool which will be described in more detail hereinafter. A pinion gear 127' is attached to the shaft 132 for driving purposes.

It is believed evident, therefore, that the protractor arm and the B gun have a vertical path of travel with respect to the stand 130. The arm is also adapted to be rotated 360 degrees with respect to the slide 128.

A wedge-shaped block 185 is shown attached to the arm 120 for supporting a feeding and cutting mechanism 183 that supplies wire to a feed plate 171 both of which will be described hereinafter. The mechanism is driven from motor means (not shown) through a gear 188 and a shaft 190 suitably journaled and connected to a grooved main roller 187 that is positioned within a housing 186 enclosed by a cover member 179.

Mounted on the arm are a dressing finger assembly 158 and identical right angle slides 133 and 134 in which are located the A and B wrapping guns, respectively. The construction of the dressing finger and slides, as well as the arm, is best disclosed by directing our attention to FIGS. 4 and 5. In the former figure the machine of FIG. 1 is viewed at the left hand end of the protractor arm (as seen from the wiring panel) which is in a horizontal position. In this position the observer is also looking toward the side of the supporting stand 130 and the slide 128. The latter figure is a partial view of the rear side of the machine of FIG. 1 that has been rotated away from the panel and into view of an observer standing in front of the machine.

The arm, as best shown in FIG. 4, is of one piece construction and includes a front face or surface 121, a rear face or surface 122, a top surface 135 and a bottom surface 136. In both the front face or surface 121 and rear face or surface 122 are pairs of V grooves 159. The top surface 135 and bottom surface 136 of the arm are of dovetail configurations as a result of the V grooves in the surfaces 121 and 122. The surfaces 135 and 136 also include longitudinal slots 123 and 124, respectively (also see FIG. 1) which accommodate pinion rods 145 and 156, respectively. A driver gear 153 is attached to the end of the rod 145 and engages a pinion gear 155 that is attached to the end of the rod 156.

Journaled between the front and the rear surfaces of the arm are a pair of slide bars 172 (see FIG. 3) and 173, the latter of which is shown in FIG. 4. The bar 173 is attached at one end to the feed plate or bar 171 by means of nut 176. The other end includes a stop nut 177 to limit the travel of the bar. Similarly, the bar 172 includes a nut 175 and a stop nut 178 for the same purposes (see FIG. 3). The bars when connected to reciprocating devices familiar to a worker skilled in the art enable the feed plate to be moved relative to the wrapping tools as shown by the phantom position of the plate.

The feed plate is a strip of metal 180 having a groove 181 in one edge thereof to accommodate a wire of preselected diameter. A cover 182 encloses and is hinged on the edge of the strip opposite to that in which the groove is located. The cover is adapted to be opened and closed by suitable means not shown which will be mentioned hereinafter.

The right angle slide 133 is keyed and slides on the top surface 121 whereas the dressing finger assembly 158 is keyed and slides on the bottom surface 122 of the arm. The construction of the slide and the assembly may be best understood by directing our attention to FIG. 5. The right angle slide includes an adjustment slide 141 and a vertical slide 144 which interfit in a tongue and groove joint 154. Ball bearings 140 ride in diamond-shaped notches 138 located along and between the contiguous sides of the joint 154, the bearings facilitating relative movement therebetween. A face 143, designated the inner face of the slide 144, has attached thereto a rack 137 that rides in a cavity 142 in the adjustment slide 141. The cavity which opens to the longitudinal slot 123 of the arm enables the rack to engage the pinion rod 145 located therein.

The right angle slide 134 also located on the top surface 135 is of identical construction to the slide 133, but is stationary due to the shaft 132 which interconnects the B wrapping gun mounted in the slide and the stationary stand 130. For convenience, the same reference characters have been designated for corresponding parts on the slides 133 and 134. The reference characters on the slide 134, however, include a prime mark to distinguish them from those assigned to the slide 133.

Returning to FIG. 3 momentarily, the A and B wrapping guns mounted in the slides 133 and 134, respectively, are substantially the same as those disclosed in my previously filed application Serial No. 601,996. Each tool as shown in FIG. 3 comprises a wrapping spindle 146 having a terminal receiving aperture 219 therein, a pinion gear 127 attached to the spindle for rotation thereof, an outer sleeve 147 arranged by means of a keyway to rotate with and slide longitudinally upon the spindle, and wrapping heads 148 and 149 located at the end of the spindle and sleeve, respectively, which cooperate in gripping a wire for wrapping about a terminal. The outer sleeve is moved relative to the spindle by a lever 150 pivoted on the outer surface of the slide 144 and connected to the sleeve.

Since the A and B wrapping guns are identical in construction, the same reference characters have been designated for corresponding parts. The reference characters of the B gun include a prime mark to distinguish them from those assigned to the A gun.

Returning to FIG. 4 again, the dressing finger assembly 158 is mounted on the bottom surface 136 of the arm 120. The assembly includes a slide 157 with structure the same but slightly larger in size than the slides 133 and 134. The assembly also includes a housing 160 and a dressing finger 165, the housing being attached to the slide by suitable fasteners. As shown in FIG. 5, the components of the slide 157 are an adjacent slide 141″, a cavity 142″ (see FIG. 5), a vertical slide 144″ including a rack 137″ and a ball bearing assembly 140″ for facilitating relative movement between the adjustment slide 141″ and the vertical slide 144″. It will be noted that the slide components have been assigned the same reference characters designated on the components of the slides 133 and 134 except for double prime marks. The rack 137″ extends through the cavity 142″ of the slide 157 to engage the pinion rod 156 positioned in the longitudinal slot 124 that is located in the bottom surface 136 of the arm 120.

The housing includes a mechanism for driving the dressing finger 165 in a plane parallel to that of the wiring panel 220. The driving mechanism of the housing is best shown in FIG. 6 which is a rear sectional view of the dressing finger assembly 158 shown in FIG. 4. In the housing are rollers 161 through 164 which are driven by means not shown. The rollers ride in grooves or tracks 167 located on opposite sides of the dressing finger 165 which comprises a finger 152 and a bar member 151. A stop 170 (see FIGS. 1 and 2) is located on and limits the movement of the dressing finger.

Having considered the structures of the slides 133 and 134 and the dressing finger assembly 158, it is next believed appropriate to indicate the synchronous movement of these members with respect to the wiring panel 220. This action will be evident by reconsidering FIG. 5 wherein the pinion rod 145 is shown engaging the racks 137 and 137′ of the slides 133 and 134, respectively, and the pinion rod 156 is shown engaging the rack 137″ of the dressing finger assembly 158. Pushing or pulling on the B wrapping gun by means of the shaft 132 (see FIGS. 1 and 3) produces translation of the rack 137′ and rotation of the rods 145 and 156 which are connected together through the driver gear 153 and the pinion gear 155. As the rods 145 and 156 rotate, the racks 137 and 137″, respectively, translate so that the slides 133 and 157 move in synchronism with the slide 134. The movement of these members is the same as the slide 134 which is toward and away from the wiring panel.

The components of the feeding and cutting mechanism 183 will now be described by referring to FIGS. 7 and 7A. The former is a rear sectional view of the mechanism with the cover removed to show the parts therein whereas the latter is a sectional view of FIG. 7 along the line 7A—7A to show the structure of certain parts. The housing is a solid member with spaced cavities therein to accommodate the grooved main roller 187 and cooperating rollers 191, 192 and 193. A passageway 174 extends from a side of the housing to the main roller cavity and terminates at a cavity in which a stripping slide 195 is adapted to translate.

The slide 195 includes a V-shaped slot 189 (see FIG. 7A) along the length thereof which connects to the passageway 174 when the slide is fully positioned within the cavity. The slide also includes a drive pin 198 for imparting reciprocating motion thereto. A stripping knife 197 positioned within the slot 189 is adapted to be raised into and removed from the slot by rotation of the pin 198.

A cutting and stripping device 206 included in the mechanism is adapted to translate in a direction normal to and cooperate with the slide 195 in severing the wire 217. The device 206 has a base member 204 that travels in a slot 199 of the housing. The base member is driven through a pin 203 that moves in a cavity 208 located in the wall of the slot 199. The device 206 also includes an angled leg member 168 that connects to the base member 204. The member 168 has a slot 201 therein to accommodate a second stripping slide 202 that is similar to the slide 195. The slide 202 includes a V-shaped groove 211 (see FIG. 7A) in which is positioned a stationary stripping knife 205. A driven pin 207 enables the slide 202 to translate with respect to the leg member 168. On translation, as will be explained more fully hereinafter, the slide enters a notch 210 in the housing.

Associated with the machine 221, but not shown, are motion producing devices which are well known to persons skilled in the art, such as, pneumatically driven plungers for opening and closing the feed plate 171 and driving the pins 198, 203 and 207, the panel stop 218, the slide bars 172 and 173, and the shaft 132; motors for rotating the spindles 146 and 146′, the main roller 187, the rollers 161 through 164 of the dressing finger assembly. The previously mentioned equipment and their connections to the machine 221 are similar to those described in my previously filed application Serial No. 601,996, and will not be described herein for the sake of brevity.

Before wiring of the panels on the assembly line, each of the machines along the length thereof is set up in a similar manner to that which will be described for a single machine. Returning to FIG. 3, a template 214 having terminals 212 and 213 representative of those to be wired at that particular wiring station is placed on the assembly line in front of the machine. A panel stop 218 (see FIGS. 1 and 2) on the assembly line is set to position the terminal 213 on the template in alignment with the path of vertical travel for the B wrapping gun. The nut 131 is loosened and the B gun is raised or lowered as required along this path until it is positioned in front of the terminal. The nut 131 is then tightened to maintain the B gun in this position. The A gun is then positioned in front of the terminal 212 by adjusting the slide 133 along the length of the arm after releasing the winged set screw 139 and properly orienting the arm. The A gun is held in this position by tightening the screw 139 and a locking mechanism 216. Next, the dressing finger assembly 158 is properly set and locked on the arm by means of the locking mechanism 216. The stop 170 on the bar member 151 (see FIG. 1) is stationed so that on operation thereof the desired bend is placed in the run of wire between the terminals. Last, as shown in FIG. 7, the insulated wire 217 stored on a reel (not shown) is fed into the feeding and cutting mechanism 183 where it passes between the roller assembly and terminates at the outer end of the stripping slide 195. The machine 221 being thus positioned and loaded is ready to operate after the remaining machines on the assembly line are similarly positioned and loaded.

FIG. 7 also shows the first operation of the machine, as well as the others on the line, after one of the wiring panels 217 is properly placed in front of the machine by the assembly line. The mechanism 183 prepares the end of the wire therein for wrapping on the terminal 275 by the A wrapping gun. To do this the pin 198 is rotated and driven to elevate the stripping knife 197 and move the slide 195 out of the cavity. As a consequence, the knife cuts and strips the insulation from the end of the wire which is held stationary by the roller assembly. The stripping knife is lowered by the opposite rotation of the pin which is then driven to return the slide to the starting position or entirely within the cavity of the housing.

The main roller 187 is next driven for a preselected interval to feed the wire into the closed feed plate 171 until the stripped end thereof reaches a position therein corresponding to that of the A gun. As the rollers operate they apply a pressure or set to the wire so that upon opening of the feed plate the wire will spring out of the plate with the stripped end entering the space between the wrapping heads 148 and 149 of the A wrapping gun. Looking at FIGS. 1 and 2, it will be seen that the feed plate is adjacent to the A and B wrapping guns. Also, operation of the lever 150 causes the wire to be gripped between the wrapping heads. The feed plate is then closed and pulled close to the arm in the event that a bend is desired in the wire run between the terminals 274 and 275. To accomplish this the dressing finger 165 is driven until the stop 170 engages the housing 160 of the dressing finger assembly.

Turning to FIG. 8, the cutting and stripping of the other end of the wire will now be described. The action of the cutter device 202 occurs in two steps. On the first step the pin 203 is driven to translate the cutter normal to the wire, the groove 211 (see FIG. 7A) in the slide shears the wire held in the groove 189 of the slide 195. Upon cutting of the wire the stripping action of the wire begins by the pin 207 being driven to translate the slide 202 with respect to the cutter. As the slide 202 translates the stationary knife 205 cuts and strips the insulation from the wire which is held between the slide and the housing. The slide enters the notch 210 in the extended position and simultaneously pulls the wire into the space between the wrapping heads 148' and 149' of the B wrapping gun. The lever 150' is operated to cause the wrapping heads to grip the wire therebetween as the slide 202 and the cutting device 206 return to their starting positions (see FIG. 7).

The A and B wrapping guns and the dressing finger advance toward the wiring panel in synchronism on the application of pressure by a pneumatic plunger, as previously explained, to the shaft 132. It will be recalled that this action is the result of the cooperation between the rods 145 and 156 and the racks 137, 137' and 137'', respectively. As the A and B guns are positioned over the terminals 275 and 274, respectively, the spindles 146 and 146' are rotated through the gears 127 and 127', respectively, to wrap the wire about the terminals as shown in FIG. 9.

After completion of the wrapped connection, the dressing finger is withdrawn from the wire to prevent snagging thereon as the wrapping guns and the finger move away from the panel to their normal positions shown in FIG. 1. The feed plate is lowered to a position adjacent the wrapping guns thereby placing the machine in condition for repeating the same connection to the next panel on the assembly line, the wired panel moving to the next station for another interconnection.

In summary, the present invention has shown apparatus for rapid wiring of large numbers of duplicate panels by coordinated operation along an assembly line of a plurality of wiring machines of relatively simple construction. In addition the machines include means which enable them to perform modular, non-modular and random wiring without resorting to programming equipment.

Figure 11:
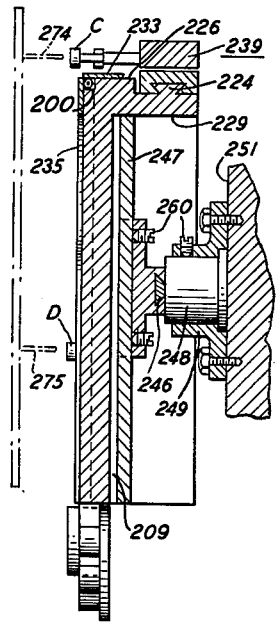
FIG. 11 is a sectional view along the line 11—11 of the embodiment disclosed in FIG. 10.

Another embodiment of the present invention is a wiring machine 222, shown in FIGS. 10 and 11, that may be substituted for the machine 221 positioned along the assembly line. Before beginning the description, a word about FIGS. 10 and 11 at this point may be helpful. The former figure is a rear view of the machine 222 looking from the panel toward the machine. The latter figure is a side sectional view of the machine 222 and the panel 220 with wrapping guns C and D positioned in line with the terminals 274 and 275 of the panel. The machine, as shown, is adapted to wire L-shaped runs between the terminals, but it may be modified to wire straight runs by fastening the C and D guns on the same side of the machine as will be explained hereinafter.

The embodiment of FIGS. 10 and 11 includes a feed plate 223 having a front plate surface 209, sides 225 and 226, and a milled groove 231 extending along two intersecting edges of a rear plate surface 200. A rear cover 235 includes a keyway 236 through which extends a key 237 to secure the cover to the rear surface. The cover 235 is adapted for relative movement with respect to the rear surface 209 to expose and to cover the milled groove as desired. Similarly, sides 225 and 226 of the plate along which the groove extends include retractable covers 232 and 233 for exposing and covering the groove as desired.

The front surface 209 of the plate includes a shoulder 229 that is set back from and extends along the length of the sides 225 and 226. The shoulder has a dovetail shaped key 224 for supporting right angle slides 238 and 239 adjacent the sides 225 and 226, respectively. The slides 238 and 239 are identical to the slides 133 and 134 described in conjunction with the machine 221. Briefly, the slides 238 and 239 include adjustment slides 234 and 234', respectively, and vertical slides 242 and 242', respectively, the latter being adapted for relative movement with respect to the other by means of tongue and groove joints 243 and 243', respectively, and ball bearings 254 and 254' which ride in diamond-shaped notches 245 and 245', respectively. The slides are stationed in selected positions by means of set screws (not shown).

Mounted in the slides 238 and 239 are wrapping guns C and D, respectively. The guns are similar to those disclosed in Reck Patent 2,743,502 issued May 1, 1956, and as shown in FIG. 13 include a spindle 280, a sleeve 281 and wrapping heads 282 and 283 which cooperate to strip and wrap the wire supplied thereto about the terminals. The guns may be modified to include an adapter 227 which aids in directing the particular terminal to be wired into the gun and deflects away those terminals adjacent to the particular terminal.

Returning to FIGS. 10 and 11, the feed plate also includes a wire feeding mechanism 264 that has a main roller 265 and cooperating rollers 244, 255 and 266 for deforming the wire in a preselected direction as it is fed into and through the groove 231. The wire is severed in the groove by means of a conventional cutter 271 secured to a block 272 adapted for relative movement normal to the groove. It should be noted, however, that the feeding and cutting mechanism 183 of the machine 221 is suitable for use with the machine 222 provided, of course, that the A and B guns are substituted for the C and D guns.

The machine 222 is supported with respect to the wiring panel 220 by means of horizontal and vertical guides 246 and 247, respectively, which are connected together through a cross slide 256 and individually journaled in the shoulder. The latter guide is secured to a shaft 248 journaled in a central bearing 249 that is secured to a base or other supporting member 251. The slide 256 enables the plate to be moved on the guides horizontally and vertically with respect to the panel. The shaft enables the plate to be oriented relative to the panel. Locking mechanisms 260 are attached to the slide and the shaft to retain these members in selected positions.

Figure 12:
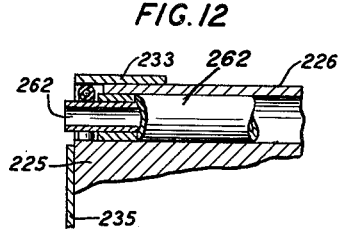
FIG. 12 is a sectional view of FIG. 10 along the line 12—12 to show a dressing finger with parts broken away.

At the corner of the sides 225 and 226 is located a tubular dressing finger 262 that is journaled in a cavity that opens into the groove 231. The dressing finger as shown in FIG. 12 is adapted for rotational movement in aiding the passage of the wire about the corner. It is also adapted for relative movement toward and away from the panel as will be explained hereinafter.

Before operation of the machine 222, it is set up with the template 214 in a manner corresponding to that described for the machine 221. Briefly, the feed plate 223 is adjusted through the slide and the shaft to bring the C and D guns into alignment with the terminals 212 and 213. Final positioning of the guns is achieved by adjusting the slides 238 and 239 along the key 224. The locking mechanisms 260 are set and the machine is ready to wrap the terminals after the wire 217 is fed into the feed mechanism 264.

The operation of this embodiment as in the case of the machine 221 requires additional motion producing equipment, i.e., plungers, motors, which have not been shown for the reasons outlined in connection with the other machine. The plungers operate the covers 233 and 235, the slides 238 and 239, the tubular dressing finger 262 and the cutter block 272. The motors operate the main roller 265 and the spindles of the C and D wrapping guns. It is believed evident that the various elements of the machine may be activated in timed relationship with each other by a cam shaft device which is familiar to any worker skilled in the art.

On the first operation the roller 265 is driven to feed wire into the groove until it arrives at the C wrapping gun. The driving means is preset to stop when the prescribed length of wire has been supplied to the groove. As the wire is fed into the groove it is deformed in a particular direction for reasons mentioned hereinbefore.

Figure 14A:
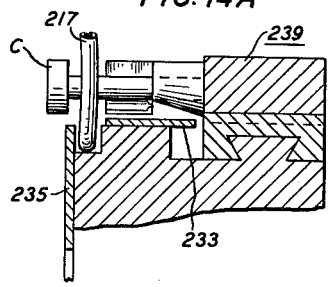

The wire is loaded into the C and D wrapping guns by retracting the side covers 232 and 233 and exposing the groove 231 as shown in FIG. 14A. The wire springs out of the groove into the space between the wrapping heads as a result of the deformation therein. An alternative method of loading the guns is shown in FIG. 14B. An ejector strip 269 protrudes through an access hole 279 that opens into the groove 231. The strip is forced into the groove by means (not shown) so that the wire is lodged in the C and D guns by positive action. This method of loading the gun eliminates the requirement for deforming the wire.

The wrapping heads of the C and D tools are closed to grip the wire as the cutter is urged into the groove to sever the wire. Following this, the rear cover is retracted to expose the groove completely thereby placing the machine in the condition for wrapping the wire on the terminals 274 and 275 of the panel.

The feed plate remains stationary as the wrapping guns and the dressing finger move toward the panel where the former encloses the terminals. The spindles are rotated to strip and wrap the wire on the terminals in accordance with the explanation given in the Reck Patent 2,743,502. At the conclusion of wrapping, the dressing finger releases and the guns return to their normal position. The side and rear covers are operated to enclose the groove which places the machine in condition for the next wiring operation.

While specific embodiments of the present invention have been shown and described, it will be understood that they are but illustrative and that various modifications may be made by those skilled in the art without departing from the spirit and scope of the present invention.

What is claimed is:

1. An automatic wiring apparatus for applying and securing wires to spaced terminals on a panel comprsing a member for supporting a plurality of wrapping tools with respect to said panel, said member including suitable linkage for alignment of the wrapping tools with preselected terminals on the panel, a mechanism attached to said member for cutting predetermined lengths of insulated wire and stripping insulation from the ends thereof, said mechanism including means for deforming the wire in a preselected direction and for feeding the wire to a feed plate, said plate including means for constraining the deformed wire and for releasing it to load the wire into the wrapping tools, means for actuating said tools to grip the wire loaded therein, and means for engaging the tools with the preselected terminals and withdrawing the tools after securing the wire to said preselected terminals.

2. An automatic wiring apparatus for applying and securing wires to spaced terminals on a panel comprising a member for supporting a plurality of wrapping tools with respect to said panel, the member being adapted to provide the tools relative movement toward or away from the panel, means for aligning the tools with preselected terminals on the panel, a mechanism attached to said member for cutting predetermined lengths of insulated wire and stripping the insulation from the ends thereof, said mechanism including means for deforming the wire in a preselected direction and for feeding the wire to a feed plate having a groove therein to accommodate the wire, cover means enclosing said groove to constrain the wire which when opened exposes the groove to enable the wire therein to spring into the tools automatically, means for actuating said tools to grip the wire loaded therein, and means for engaging the tools with the preselected terminals and withdrawing the tools after securing the wire to said preselected terminals.

3. The automatic wiring apparatus described in claim 2 wherein the member includes a dressing finger adapted for relative movement parallel to the panel.

4. The automatic wiring apparatus described in claim 3 wherein means included in the member synchronizes the wrapping tools and the dressing finger in movement toward or away from the wiring panel.

5. Apparatus for wiring spaced terminals in a prescribed manner on each of a plurality of panels comprising a plurality of wiring stations located in series along an assembly line that successively transports each panel between the wiring stations, an automatic wiring machine at each station for applying and securing wires to preselected terminals on each panel, said machine comprising a member for supporting a plurality of wrapping tools with respect to the panel, said member including suitable linkage for alignment of the wrapping tools with preselected terminals on the panel, a mechanism attached to said member for cutting predetermined lengths of insulated wire and stripping insulation from the ends thereof, said mechanism including means for deforming the wire in a preselected direction and for feeding the wire to a feed plate, said plate having releasable means to constrain the deformed wire and which when released allows the wire to spring out thereby loading the wire into the wrapping tools, means for actuating said tools to grip the wire loaded therein, and means for engaging the tools with the preselected terminals and withdrawing the tools after securing the wire to said preselected terminals.

6. An automatic wiring apparatus for applying and securing wires to spaced terminals on a panel comprising a protractor arm suitably secured for 360 degrees orientation in a plane substantially parallel to the panel, a plurality of wrapping tools positioned on said arm, means for aligning said tools with preselected terminals on said panel, a mechanism attached to said protractor arm for cutting predetermined lengths of insulated wire and stripping the insulation from the ends thereof, said mechanism including means for feeding the wire to a feed plate, said wire being deformed in a preselected direction by the mechanism as it is fed to the plate, said plate including means to load the wire into the wrapping tools automatically, means for actuating said wrapping tools to grip the wire loaded therein, and means for engaging the tools with the preselected terminals and withdrawing the tools after securing the wire to said preselected terminals.

7. The apparatus described in claim 6 wherein the feed plate comprises a covered plate having a groove located in an edge thereof, a pair of slide bars journaled in the arm, said bars being attached to the plate and adapted for relative movement of the plate with respect to the tools, and means for opening the covered plate to expose the groove therein.

8. An automatic wiring apparatus for applying and securing wires to spaced terminals on a panel comprising a feed plate having suitable linkage attached thereto to enable the plate to move in right angle directions of a plane substantially parallel to the panel, said plate having a milled groove in an edge thereof for accommodating a wire of preselected diameter, retractable cover means attached to the plate for normally enclosing the groove and exposing the groove when operated, said plate including means for supporting a plurality of wire wrapping tools adapted for movement normal to the panel, means for aligning said tools with preselected terminals on said panel, a mechanism attached to said feed plate for cutting predetermined lengths of insulated wire and stripping the insulation from the ends thereof, said mechanism including means for feeding the wire to the milled groove, said wire being deformed in a preselected direction by the mechanism as it is fed to the groove, means for retracting the cover means from said groove to load the wire into the wrapping tools automatically, means for actuating said tools to grip the wire loaded therein, and means for engaging the tools with the preselected terminals and withdrawing the tools after securing the wire to said preselected terminals.

References Cited in the file of this patent

UNITED STATES PATENTS

| | | |
|---|---|---|
| 2,696,656 | Madden | Dec. 14, 1954 |
| 2,743,502 | Reck | May 1, 1956 |
| 2,855,159 | Mallina | Oct. 7, 1958 |
| 2,862,670 | Mallina | Dec. 2, 1958 |
| 2,872,129 | Ellis | Feb. 3, 1959 |